Feb. 16, 1960     R. D. BOISJOLIE     2,924,870
CAPACITOR EYELET PROCESS
Filed Dec. 30, 1955

RALPH D. BOISJOLIE
*INVENTOR.*

BY Roland A Dexter
HIS ATTORNEY

United States Patent Office 2,924,870
Patented Feb. 16, 1960

2,924,870

CAPACITOR EYELET PROCESS

Ralph D. Boisjolie, North Adams, Mass., assignor to Sprague Electric Company, North Adams, Mass., a corporation of Massachusetts Application December 30, 1955, Serial No. 556,547

3 Claims. (Cl. 29—25.42)

This invention relates to a process of producing a new and improved capacitor eyelet construction. This application is a continuation-in-part of my co-pending application S.N. 233,574, filed June 26, 1951, now U.S. Letters Patent 2,739,277, issued March 20, 1956.

More specifically, this invention is concerned with improving the eyelet construction used in small molded electrical capacitors, of the type illustrated in the Robinson et al., Letters Patent 2,526,688, issued October 14, 1950. Capacitor eyelets as shown in this patent provide generally satisfactory passage ways for introducing impregnants into molded tubular rolled capacitor units. However, considerable difficulty has been had with eyelets of the Robinson et al. patent because of the difficulty in positioning lead-wires therein so that these wires will stay in position during later steps in the processing of the capacitor unit. Also, there has been a considerable problem due to lead-wires breaking away from the eyelets at the solder seals that seal the capacitor units and secure the lead-wires to the eyelet.

It is an object of this invention to provide an eyelet which holds the lead-wire for a molded capacitor unit in position in such a manner that the entire unit may be processed with the lead-wire in its final position. A further object is to form an eyelet construction in which there is less likelihood of the capacitor terminal lead-wire breaking away from the unit than there is in a conventional eyelet construction. Another object is to produce an eyelet which when mounted in the molded casing of the capacitor will provide anchoring means which will inhibit undesired removal from the casing. A still further object of this invention is to produce a capacitor eyelet having a lead-wire secured thereto in such a manner that the capacitor may be impregnated after the eyelet and lead-wire sub-assembly has been secured to the rolled capacitor unit. Another object is to provide a simple and inexpensive apparatus for uniformly and accurately producing the crimp that secures the lead-wire in the eyelet. Further objects will be apparent during the course of the following specification and claims and from reference to the appended drawing.

Figure 1:
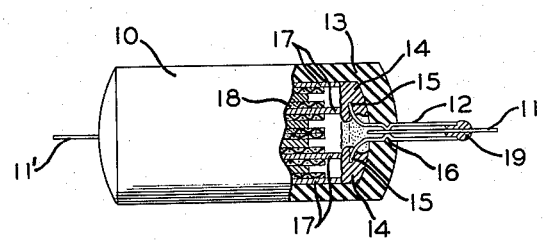
Figure 2:
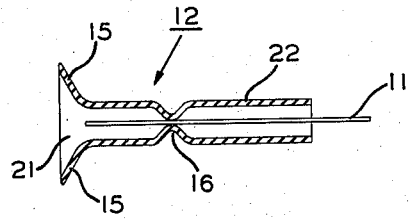
Figure 3:
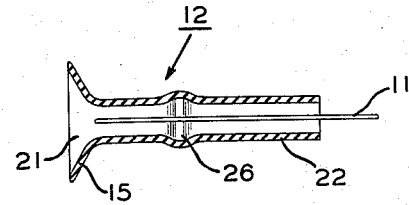
Figure 4:
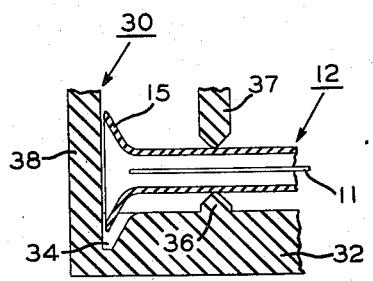

In the drawing, Fig. 1 shows a small molded capacitor unit, partially in section, showing the eyelet construction of this invention and specifically illustrating the method of embedding the eyelet in the outer casing and the method of securing the eyelet to the extended foil of the capacitor unit; Fig. 2 illustrates in greater detail, a sectional view of the eyelet construction of Fig. 1 showing the wire crimped in position in the eyelet; Fig. 3 shows a view taken at right angles to position shown in Fig. 2; and Fig. 4 is a sectional view of the holding jig with the crimping jaws in position to close down on the eyelet.

In Fig. 1 the capacitor unit 10 is formed of a number of convolutely wound alternate electrodes 17 and dielectric spacers 18. One set of electrodes 17 project from the end of the rolled unit and are in contact with the solder mass 14 positioned within the molded casing 13. This casing is provided with an appropriate opening 20 through which the lead-in member or eyelet 12 projects.

Flanges 15 on the inner end of this lead-in member 12 are held in position by the solder mass 14. A suitable lead wire 11 projects into the eyelet 12 through the solder seal 19 and past the crimp joint 16 (where it is held in position) and the inner edge of the molded casing 13. The crimp 16 is completely surrounded by the casing 13, so that the eyelet is prevented from being either twisted, pulled or pushed out of position.

In the construction of eyelet 12 seen in Figs. 2 and 3, the lead-in wire 11 is held within the eyelet 12 by means of the crimp joint 16 which is formed after the wire has been positioned within the eyelet. Any suitable means of formation may be used although it is contemplated to use the opposing jaws of a crimping tool for this operation.

Fig. 4 shows a hand jig 30 which provides a suitable support means for holding the eyelet 12 in position for crimping. Jig 30, as shown in the preferred embodiment, comprises a base member 32 having a scooped out nest portion 34 of the general configuration of bell portion 21 of eyelet 12. Upright member 38, which may be integral with the base 32, comprises the rear wall of nest 34. Base 32 is also provided with a raised member 36 which forms one of the crimping jaws. While in the illustrated embodiment jaw 36 is shown integral with base 32 it is to be understood that jaws 36 could be a separate anvil member constructed and arranged to fit within a suitable socket in base 32. Or jaw 36 could be made a movable jaw by providing linkage to permit cooperative or independent action with upper crimping jaw 37. A suitable actuating means may be provided for positioning jaw 37 over jaw 36 and for causing controlled operation of jaw 37, as for example, by a drill press arbor. Jaws 36 and 37 are preferably blunt members having planar faces of a width slightly greater than the diameter of the eyelet member 12. The apex angle of jaws 36 and 37 is roughly 60° for convenience of operation in that such an angle provides a crimp which secures wire 11 within eyelet 12 without danger of damage to the eyelet. In use, eyelet 12 is positioned with bell like portion 21 against the rear upright 38 and with flange 15 seated within nest 34. Such positioning of eyelet 12 automatically places the body portion on planar jaw 36 for the crimping operation. Wire 11 is inserted within eyelet 12, by hand or by suitable mechanical means, and crimping jaw 37 is caused to descent. Jaw 37 is provided with stop means to limit the travel thereof, so as to permit crimping of eyelet 12 to the extent that wire 11 is secured at the crimp and so as to prevent flattening at the crimp to the extent that the passage way through eyelet 12 would be completely closed. Since jaws 36 and 37 are provided with planar faces the crimp produced by their action will secure wire 11 as shown at 16 in Fig. 2 and will leave a passage on either side of wire 11 for the introduction of capacitor impregnants as shown in Fig. 3.

After wire 11 has been crimped in eyelet 12 the thus assembled sub-assembly may be handled by means of wire 11 and may be brought against the extended foil of a capacitor and secured thereto, as by solder 14. That is to say, there is no longer the necessity of handling the eyelet alone to provide securing of the eyelet to the capacitor unit. The bell-like member 21 may be held against the capacitor unit by the eyelet body 12, or by the wire 11 in that the wire is secured against longitudinal as well as lateral movement in the eyelet. The soldering may be accomplished by conventional hand operation or it may be accomplished by the use of soldering machines in that the sub-assembly 11 and 12 produces a device quite adaptable to machine handling.

Terminal lead 11' is secured to the other end of the rolled capacitor unit in a conventional manner. The entire unit is then encapsulated in a suitable resin, as for example by the method and in the resins disclosed in the above cited Robinson et al. patent. In encapsulating a unit using this new eyelet it is desirable to extend the resin to a point above the crimp. As is best shown in Fig. 3, the crimping action by planar jaws 36 and 37 produces a flattening and slight extension indicated at 26. When this extension is embedded, it provides a firm anchoring member so that any pulling or twisting of the eyelet is greatly resisted. The unit may then be impregnated in the manner indicated in the Robinson et al. patent, that is the impregnation is introduced into the unit through eyelet 12. The impregnation passes around the crimped area as also best shown in Fig. 3. The outer end of eyelet 12 may then be sealed by suitable means, as for example by solder 19.

It is to be noted that applicant's new and improved eyelet construction and process of assembly thereof, utilizes known eyelets and requires only that the crimp be produced by planar jawed member or other suitable means whereby a crimp will be produced which allows a passage-way past the crimped area and yet at the same time, produces a crimp which is strong enough to prevent longitudinal and lateral movement of the wire engaged therein. Since the crimp is positioned close to the bell shaped member no more than an ordinary amount of care need be taken in encapsulating the unit with resin casing 13 to ensure that crimped area 16 and flattened area 26 are embedded so as to provide the mechanical anchoring so advantageous in applicant's construction.

With this construction even if a poor electrical contact is made between wire 11 and eyelet 12 by solder 19 the unit will function properly, in that a good electrical contact is assured at crimp 16. Furthermore, even if a poor mechanical bond is made by solder 19 the lead-wire will not be lost, thereby rendering the unit inoperative, because a good mechanical bond has also been obtained by crimp 16. The fact that crimp 16 is remote from solder 19 means that there is less likelihood that wire 11 will break away from the capacitor unit, in that spaced gripping of the wire will present a rigidly held wire.

It should be noted that applicant's new and novel construction and process of assembly of crimped eyelet 12 is such that no change in impregnation or encapsulation techniques need be made over the Robinson et al. disclosure. That is, the eyelet is open to receive impregnation, as in the Robinson et al. patent, and the eyelet is secured to the extended foils by solder and is secured in the outer casing the same as in the Robinson et al. patent. Because of applicant's construction, any strain applied to the eyelet terminal will be more directly transmitted to the molded casing by way of the eyelet crimp so that less of the strain will be felt at the solder joint between the eyelet and the capacitor electrodes.

The eyelet construction forming the subject matter of this application is readily adaptable to devices other than rolled capacitor units, for example it may be used with small molded resistors.

As many apparently widely different embodiments of this invention may be made without departing from the spirit and scope hereof, it is to be understood that the invention is not limited to the specific embodiments hereof, except as defined in the appended claims.

I claim:

1. A process for assembling a capacitor comprising mounting a lead-wire within an eyelet by crimping the down upon the lead-wire, then securing the eyelet and lead-wire sub-assembly to an end terminal of a capacitor, then coating the capacitor and the crimped area of the eyelet so as to provide a capacitor casing, then impregnating said capacitor through said eyelet and then sealing said eyelet.

2. In a process for manufacturing capacitors, the improvement which comprises preparing a lead-wire containing eyelet by inserting a lead-wire into an eyelet, then crimping said eyelet about said lead-wire to prevent its longitudinal movement, then rigidly positioning said lead-wire containing eyelet by bonding to a terminal end of a capacitor unit, then encasing said assembly in a jacket to enclose said capacitor unit and attached lead-wire containing eyelet including the crimped portion of said eyelet, then impregnating the capacitor unit through the eyelet, and then sealing the eyelet.

3. An improved capacitor assembly process comprising inserting a wire in a narrow neck end of an eyelet which has a narrow mouthed end and a wide mouthed end, then securing said wire within said eyelet near said wide mouthed end, then securing said wide mouthed end of said eyelet against a terminal of a capacitor unit, then providing a covering for said capacitor unit and for said eyelet including said wire securing area thereon, then impregnating said capacitor unit through said narrow mouthed end of said eyelet, then sealing said narrow mouthed end of said eyelet.

References Cited in the file of this patent

UNITED STATES PATENTS

| | | |
|---|---|---|
| 2,396,913 | Carlson | Mar. 19, 1946 |
| 2,424,849 | Rogoff | July 29, 1947 |
| 2,470,280 | Ackerman | May 17, 1949 |
| 2,526,688 | Robinson et al. | Oct. 24, 1950 |
| 2,694,433 | Fulton et al. | Nov. 16, 1954 |
| 2,695,443 | Wagner | Nov. 30, 1954 |
| 2,703,856 | Powers et al. | Mar. 8, 1955 |
| 2,704,880 | Brennan | Mar. 29, 1955 |

UNITED STATES PATENT OFFICE

CERTIFICATE OF CORRECTION

Patent No. 2,924,870                  February 16, 1960

Ralph D. Boisjolie

It is hereby certified that error appears in the printed specification of the above numbered patent requiring correction and that the said Letters Patent should read as corrected below.

Column 4, line 14, after "the" insert -- eyelet --.

Signed and sealed this 16th day of August 1960.

(SEAL)
Attest:

KARL H. AXLINE
Attesting Officer

ROBERT C. WATSON
Commissioner of Patents